US012632730B2

(12) United States Patent
Yang

(10) Patent No.: US 12,632,730 B2
(45) Date of Patent: May 19, 2026

(54) NEIGHBORHOOD-SPECIFIC LOSS FOR CORRECTING SCORE DISTRIBUTION DISTORTION

(71) Applicant: VISA INTERNATIONAL SERVICE ASSOCIATION, San Francisco, CA (US)

(72) Inventor: Pei Yang, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 898 days.

(21) Appl. No.: 17/944,984

(22) Filed: Sep. 14, 2022

(65) Prior Publication Data

US 2024/0086701 A1     Mar. 14, 2024

(51) Int. Cl.
| | |
|---|---|
| *G06N 3/08* | (2023.01) |
| *G06F 16/906* | (2019.01) |
| *G06N 3/084* | (2023.01) |
| *G06N 5/01* | (2023.01) |
| *G06Q 20/40* | (2012.01) |

(52) U.S. Cl.
CPC .............. *G06N 3/08* (2013.01); *G06N 3/084* (2013.01); *G06F 16/906* (2019.01); *G06N 5/01* (2023.01); *G06Q 20/4016* (2013.01)

(58) Field of Classification Search
CPC ............ G06N 3/08; G06N 5/01; G06N 3/084; G06N 3/045; G06N 3/0455; G06N 3/0895; G06N 3/09; G06N 3/091; G06N 3/092; G06N 3/094; G06N 3/096; G06N 3/098; G06N 3/0985; G06Q 20/4016; G06F 16/90; G06F 16/906
See application file for complete search history.

(56) References Cited

U.S. PATENT DOCUMENTS

| | | | | | |
|---|---|---|---|---|---|
| 11,005,872 | B2 * | 5/2021 | Dherange | ................ | G06N 7/01 |
| 11,531,879 | B1 * | 12/2022 | Teig | ........................ | G06N 3/08 |
| 2018/0336457 | A1 * | 11/2018 | Pal | ........................ | G06N 3/045 |

(Continued)

FOREIGN PATENT DOCUMENTS

CN          112906626 A          6/2021

OTHER PUBLICATIONS

Karpusha, Maryna, Sunghee Yun, and Istvan Fehervari. "Calibrated neighborhood aware confidence measure for deep metric learning." arXiv preprint arXiv:2006.04935 (2020). (Year: 2020).*

(Continued)

*Primary Examiner* — Andrew L Tank
(74) *Attorney, Agent, or Firm* — Kilpatrick Townsend & Stockton LLP

(57)          ABSTRACT

A method is disclosed. The method includes receiving a training dataset including a set of training samples. The method then includes obtaining a first parameter value and a second parameter value. After the parameters are determined, the training dataset can be fed into a machine learning model to train the machine learning model using a neighborhood-specific loss function. The method can then include receiving a second dataset including a set of second samples. Each second sample can then be input into the trained machine learning model to determine a prediction score for each second sample, and the prediction scores can form a bimodal distribution centered around the first parameter and the second parameter.

20 Claims, 7 Drawing Sheets

(56) References Cited

U.S. PATENT DOCUMENTS

| | | | |
|---|---|---|---|
| 2019/0147983 A1 | 5/2019 | Shan et al. | |
| 2021/0081717 A1* | 3/2021 | Creed | G06N 5/022 |
| 2021/0342635 A1* | 11/2021 | Zoldi | G06F 17/18 |
| 2022/0101624 A1* | 3/2022 | Hinton | G06N 3/047 |
| 2022/0129727 A1* | 4/2022 | Chen | G06Q 20/10 |
| 2022/0253699 A1* | 8/2022 | Hoshen | G06N 3/08 |

OTHER PUBLICATIONS

Esposito, et al., "GHOST: Adjusting the Decision Threshold to Handle Imbalanced Data in Machine Learning", Journal of Chemical Information and Modeling, The Authors, Published by American Chemical Society 2021, pp. 2623-2640 (18 pages).

\* cited by examiner

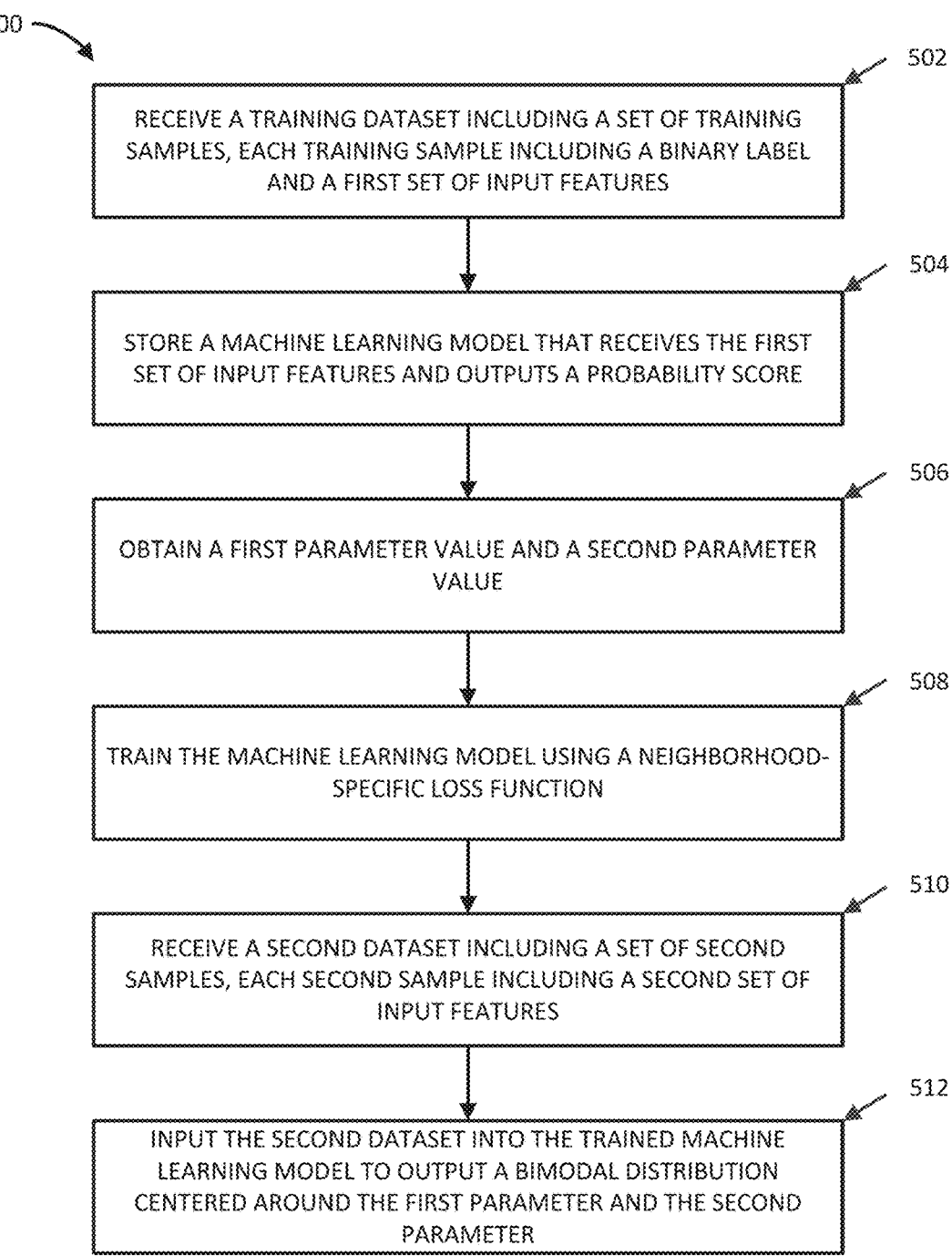

500

502

RECEIVE A TRAINING DATASET INCLUDING A SET OF TRAINING SAMPLES, EACH TRAINING SAMPLE INCLUDING A BINARY LABEL AND A FIRST SET OF INPUT FEATURES

504

STORE A MACHINE LEARNING MODEL THAT RECEIVES THE FIRST SET OF INPUT FEATURES AND OUTPUTS A PROBABILITY SCORE

506

OBTAIN A FIRST PARAMETER VALUE AND A SECOND PARAMETER VALUE

508

TRAIN THE MACHINE LEARNING MODEL USING A NEIGHBORHOOD-SPECIFIC LOSS FUNCTION

510

RECEIVE A SECOND DATASET INCLUDING A SET OF SECOND SAMPLES, EACH SECOND SAMPLE INCLUDING A SECOND SET OF INPUT FEATURES

512

INPUT THE SECOND DATASET INTO THE TRAINED MACHINE LEARNING MODEL TO OUTPUT A BIMODAL DISTRIBUTION CENTERED AROUND THE FIRST PARAMETER AND THE SECOND PARAMETER

FIG. 5

NEIGHBORHOOD-SPECIFIC LOSS FOR CORRECTING SCORE DISTRIBUTION DISTORTION

BACKGROUND

Score distribution distortions occur in deep learning models that are trained for binary classification problems. Such issues arise due to the use of cross-entropy as a loss function. The score distributions produced by these deep learning models produce scores that are distributed closely to either 0 or 1. Score distribution distortion is prevalent in imbalanced binary classification problems, where one classification is much more likely than the other classification, such as in fraud classification (e.g., is a transaction fraudulent or not), spam detection (e.g., is an email spam or not), or network attacks (e.g., is a network access request legitimate or not). Difficulties arise in the interpretation of and use of distorted score distributions.

Embodiments of the disclosure address this problem and other problems individually and collectively.

SUMMARY

One embodiment of the disclosure includes a method. The method comprises: receiving a training dataset that includes a set of training samples, each training sample including a binary label and a first set of input features; storing a machine learning model that, for each training sample, receives the first set of input features and output a prediction score of the training sample, wherein prediction scores below a threshold indicate a first classification and prediction scores above the threshold indicate a second classification; obtaining a first parameter value corresponding to the first classification and a second parameter value corresponding to the second classification for training the machine learning model; training, using the training dataset, the machine learning model using a neighborhood-specific loss function, wherein the neighborhood-specific loss function has, for each training sample of the training dataset, a first difference term between the prediction score of the training sample and the first parameter value and a second difference term between the prediction score of the training sample and the second parameter value, wherein the binary label determines whether the first difference term or the second difference term is non-zero; receiving a second dataset that includes a set of second samples, each second sample including a second set of input features; and for each second sample of the second dataset, inputting the second set of input features into the trained machine learning model, wherein the trained machine learning model uses the second set of input features to determine a prediction score for each of the second samples of the second dataset, and wherein the prediction scores of the second samples form a bimodal distribution centered around the first parameter value and the second parameter value.

Another embodiment of the disclosure includes a computer comprising a processor; and a non-transitory computer readable medium comprising instructions executable by the processor to perform a method including: receiving a training dataset that includes a set of training samples, each training sample including a binary label and a first set of input features; storing a machine learning model that, for each training sample, receives the first set of input features and output a prediction score of the training sample, wherein prediction scores below a threshold indicate a first classification and prediction scores above the threshold indicate a second classification; obtaining a first parameter value corresponding to the first classification and a second parameter value corresponding to the second classification for training the machine learning model; training, using the training dataset, the machine learning model using a neighborhood-specific loss function, wherein the neighborhood-specific loss function has, for each training sample of the training dataset, a first difference term between the prediction score of the training sample and the first parameter value and a second difference term between the prediction score of the training sample and the second parameter value, wherein the binary label determines whether the first difference term or the second difference term is non-zero; receiving a second dataset that includes a set of second samples, each second sample including a second set of input features; and for each second sample of the second dataset, inputting the second set of input features into the trained machine learning model, wherein the trained machine learning model uses the second set of input features to determine a prediction score for each of the second samples of the second dataset, and wherein the prediction scores of the second samples form a bimodal distribution centered around the first parameter value and the second parameter value.

A better understanding of the nature and advantages of embodiments of the invention may be gained with reference to the following detailed description and accompanying drawings.

BRIEF DESCRIPTION OF THE DRAWINGS

FIG. 5 shows a flowchart for a method according to embodiments.

DETAILED DESCRIPTION

Embodiments provide for a neighborhood-specific loss function for use in machine learning. The neighborhood-specific loss function can be used as a loss function for training a machine learning model such as neural network implementing a binary classifier. The neighborhood-specific loss function includes tunable parameters $(n_0, n_1)$ that modify the centers of resultant score distributions (e.g., the modes of the bimodal distribution). A user training a neural network can select a first parameter $n_0$ and a second parameter $n_1$ according to some prior knowledge of their binary classification problem, such as a separation distance between the first parameter $n_0$ and the second parameter $n_1$ (e.g., the user may select the parameters such that the distributions do or do not overlap), an average number of positives (e.g., for an expected 90% appearance rate of a first classification or an equivalent expected 10% appearance rate of a second classification, the parameters may be chosen as $n_0=0.90$ and $n_1=0.10$), or some other criterion. Embodiments can reduce the score distribution distortion produced by commonly used loss functions, which result in highly spiked distributions at the extrema.

I. Machine Learning

Machine learning is a type of artificial intelligence that can be used to predict an output through the use of some model. Some example use cases of machine learning include fraud detection for transactions, spam and bot detection, medical diagnosis, and image recognition. In these examples, the end prediction can determine if the input belongs to one of two possible classification and is known as binary classification. For example, in fraud detection, it can be determined if a transaction is fraudulent or legitimate; in spam and bot detection, it can be determined if an email, phone call, or network access was made by a human or a bot; in medical diagnosis, it can be determined if a patient has a disease or if they do not, and in image recognition, it can be determined if an image has an object or if it does not. In order to generate accurate predictions, the machine learning model must first be trained.

Figure 1:
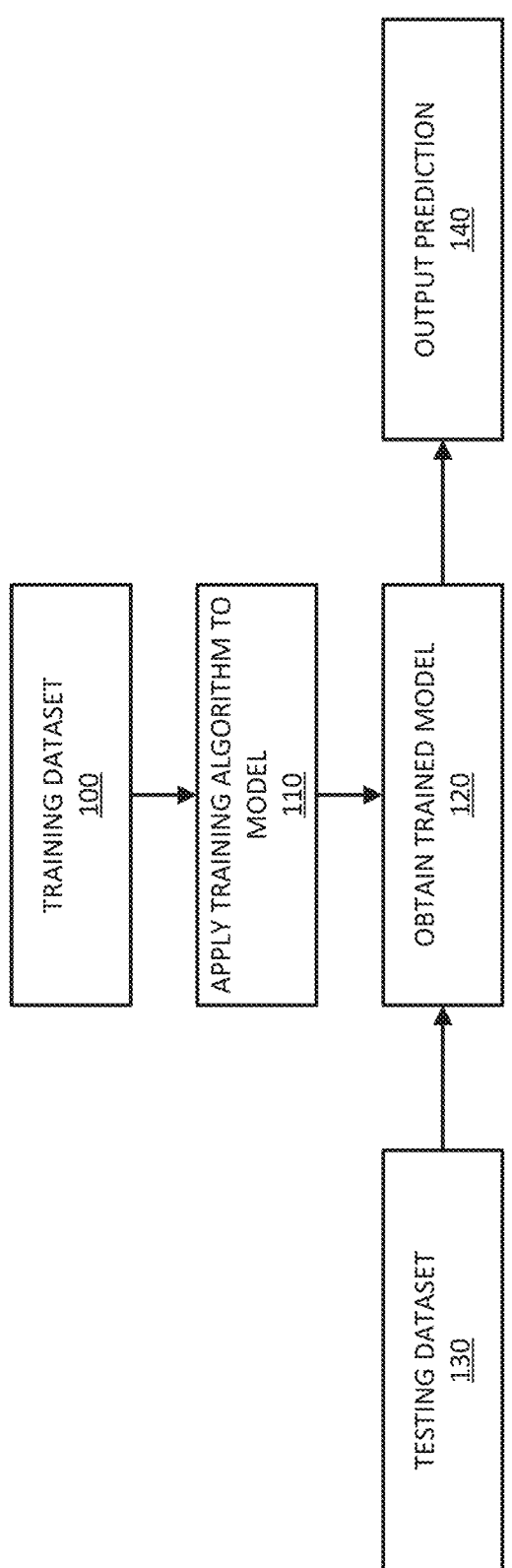
FIG. 1 shows a block diagram of a machine learning system according to embodiments.

FIG. 1 shows a block diagram of a machine learning system according to embodiments. A user of the machine learning system can train a machine learning model using a computer. The user may first make a selection of the type of machine learning model that they will use, such as neural networks, genetic models, regression analysis, or decision trees. After the user makes their selection of machine learning model, they can then select a training algorithm to train the machine learning model. FIG. 1 shows the steps that can then be taken to first train the machine learning model using the training algorithm selected, and then to use the model to output a prediction.

At step 100, a training dataset can be obtained. The training dataset can vary based on the choices in the machine learning model and training algorithm selected by the user. In particular, for binary classification, a labeled training dataset is commonly used. The labeled training dataset can include a large amount of inputs to the machine learning model, and each input can be classified as belonging to one of two classifications. For example, a labeled training dataset for a binary classifier used for fraud detection can include transaction data of at least 900 legitimate transactions and at least 100 fraudulent transactions. Commonly, the training dataset can be at least 25%, 15%, or 10% of the size of a second dataset (e.g., a dataset that will be fed into the machine learning model after it is trained) to sufficiently train the machine learning model.

At step 110, a training machine learning algorithm can be applied to the selected model. Common examples of machine learning include supervised learning, where training data includes the inputs and the desired or known output, and unsupervised learning, where training data includes only the inputs. Backpropagation is a supervised learning technique in which the gradient of a loss function is used to train the machine learning model. Other training techniques can be used, e.g., other gradient techniques. To train the machine learning model, the user can input the training dataset into the machine learning model to obtain an output prediction score. A loss function (e.g., cross-entropy, mean square error, mean absolute error, etc.) can then be used to compute the difference between the output prediction score and the expected output prediction score as given by the labeled training data. Parameters of the machine learning model can then be used to lower the loss as determined by the gradient of the loss function. This process of inputting training data, computing a loss as determined by a loss function, and updating parameters of the machine learning model can be repeated until the minimum of the loss function is found.

At step 120, after the training algorithm has found the minimum of the loss function, the user can obtain the trained machine learning model. The trained machine learning model can have optimized parameters, such as a trained neural network having optimized weights for each node.

At step 130, after the trained machine learning model is obtained, the user can use the trained machine learning model to generate predictions. The user obtain a second dataset, which can be similar to the training dataset. For example, for fraud detection, the second dataset can be a dataset that includes transaction data of 10,000 transactions without any labels. For network attack detection, the second dataset can be a dataset that include network data of 10,000 network access request without any labels.

At step 140, after obtaining the second dataset, the user can input the second dataset into the trained machine learning model to obtain the output prediction of the trained machine learning model. In the case of a binary classification, the output can be prediction score that determines if the input belongs to one of two classes. More specifically in fraud detection, the output predication can be, for each transaction in the testing transaction dataset, whether the transaction is fraudulent or not. The most common choice of loss functions for binary classification is cross-entropy. The choice of cross-entropy as a loss function results in the output prediction of the trained machine learning model to be centered about "0" and "1" depending on the classification (e.g., in a fraud detector, "0" can correspond to a legitimate transaction and "1" can correspond to a fraudulent transaction). Such distorted outputs are often highly spiked about 0 and 1 (shown by in FIG. 2 as the cross-entropy distribution 200) and can be difficult to interpret and use as they are too close to the extrema. Embodiments provide for a neighborhood-specific loss function, which is a type of loss function that specifies a neighborhood for each classification in a binary classification problem.

Figure 2:
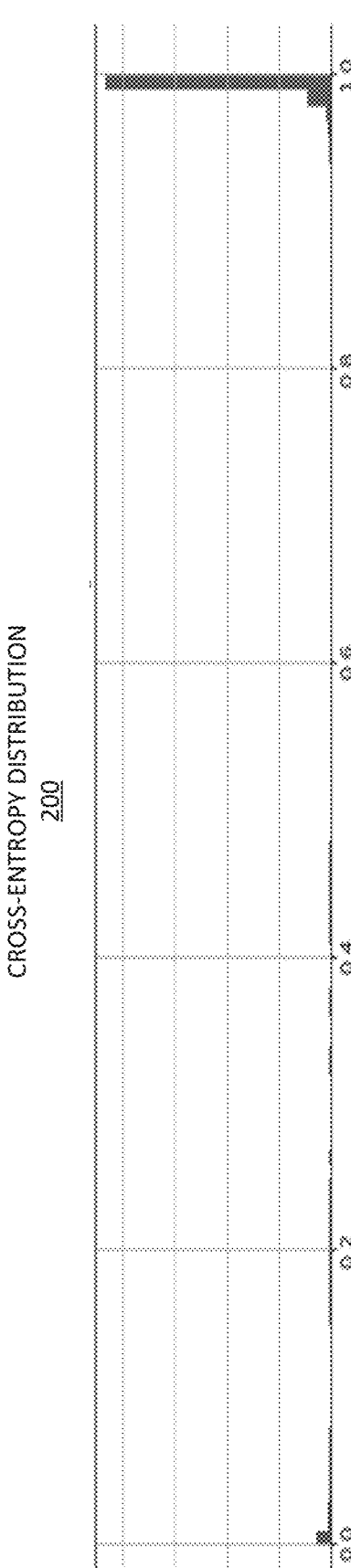
FIG. 2 shows a graph of a cross-entropy distribution according to embodiments.

FIG. 2 shows a graph of a cross-entropy distribution 200 according to embodiments. The cross-entropy distribution 200 is an example of a result of performing a binary classification using a neural network that implements a binary classifier trained using cross-entropy as the loss function. The neural network can output a prediction score for each input (e.g., training sample or second sample) that it receives. As shown by the cross-entropy distribution 200, the output prediction scores of the neural network form two peaks near 0 and 1. A threshold can then be applied to the cross-entropy distribution 200 to classify each input as a first classification or a second classification. For example, if a threshold of 0.5 is used, inputs with a prediction score under 0.5 can be classified as belonging a first classification (e.g., a fraudulent transaction) and inputs with a prediction score above the 0.5 can be classified as belonging to a second classification (e.g., a legitimate transaction).

One such example of the machine learning model described above is a neural network. Neural networks are a type of machine learning model that have components including an input, a weight for each node of the neural network, a bias, and an output.

Figure 3:
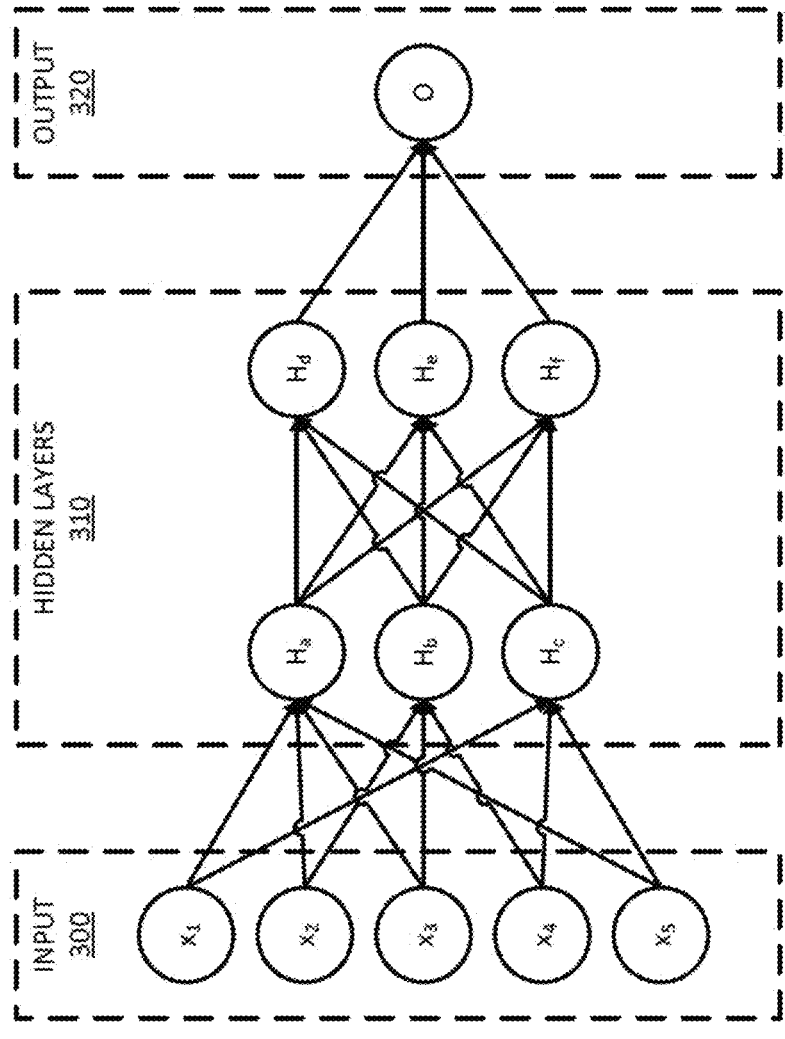
FIG. 3 shows a block diagram of a neural network according to embodiments.

FIG. 3 shows a block diagram of a neural network according to embodiments. The neural network includes an input 300, hidden layers 310, and an output 320. Neural networks with a number of hidden layers 310 (also known as the depth) greater than three are sometimes referred to as deep learning neural networks. Such deep learning neural network are common in implementations of binary classifiers. In FIG. 3. The neural network has a depth of two. As described above, the input 300 can be a training dataset for training of the neural network, or a second dataset for live use of the neural network. In the example of fraud detection, the input 300 can include transaction data of a transaction, and the output 320 can the a prediction score for if the transaction corresponding to the input 300 is fraudulent.

The nodes of the input 300 are labeled by $x_1$, $x_2$, $x_3$, $x_4$, and $x_5$. The nodes of the hidden layers 310 are labeled by $H_a$, $H_b$, $H_c$, $H_d$, $H_e$, and $H_f$. The node of the output 320 is labeled by O. A tunable weight $w_{ij}$ can be applied to each input when it is being passed between nodes. For example, when passing the node $x_1$ to the node $H_c$, a weight $w_{1c}$ can be applied. Similarly, when passing the node $H_c$ to the node $H_f$, a weight $w_{cf}$ can be applied. These weights are parameters that can be modified during the training of the neural network in order to minimize the loss as determined by the loss function. For example, during training of the neural network, the gradient of the loss function can be computed, and the weights of the neural network can be modified to move down the gradient to minimize the loss function.

II. Neighborhood-Specific Loss Function

Neural networks can be trained by minimizing loss functions. As described in step 110 of FIG. 1, a machine learning model such as a neural network can be trained by minimizing a loss function. Neighborhood-specific loss functions are a type of loss function that specifies neighborhoods for output scores of a binary classification through the use of a first parameter $n_0$ and a second parameter $n_1$. One such example of a neighborhood-specific loss function is as follows:

$$NSL = \frac{1}{N} \sum_{k=1}^{N} \left[ (1 - y_i)(p_i - n_0)^2 + y_i(p_i - n_1)^2 \right]$$

where $y_i$ is the ground truth provided by the binary label of a training dataset and $p_i$ is the output prediction score generated by the neural network. The neighborhood-specific loss function can include the summation, over all training samples of a training dataset, of a first difference term and a second difference term. The first difference term (e.g., $(p_i-n_0)$) can compute the difference between the prediction score and the first parameter $n_0$. The second difference term (e.g., $(p_i-n_1)$) can compute the difference between the prediction score and the second parameter $n_1$. The first difference term and the second difference term can be squared, cubed, or raised to some other power. The binary label $y_i$ can then determine which of the first difference term or the second difference term is non-zero, as only one of $(1-y_i)$ or $y_i$ can be non-zero at a time if $y_i$ is a binary value. The use of the neighborhood-specific loss functions reduces the score distribution distortion in binary classifications, which can be seen in the examples shown by FIG. 4.

The choices of the first parameter $n_0$ and the second parameter $n_1$ can be based on various criteria. For example, the user can select a separation distance between the first parameter $n_0$ and the second parameter $n_1$, such that the resultant output prediction score does or does not overlap. One example of such a criterion can include the distance between the first parameter $n_0$ and the second parameter $n_1$ being greater than 0.2 (e.g., $|n_0-n_1|>0.2$). In another example, the user can have some previous knowledge (e.g., based on a previous iteration) such as an average number of positives (e.g., for an expected 90% appearance rate of a first classification or an equivalent expected 10% appearance rate of a second classification in a binary classification, the parameters may be chosen as $n_0=0.90$ and $n_1=0.10$). A standard choice of the first parameter $n_0$ and the second parameter $n_1$ can be to set the first parameter $n_0$ in the range of (0.2, 0.4) and to set the second parameter $n_1$ in the range of (0.6, 0.8).

Figure 4:
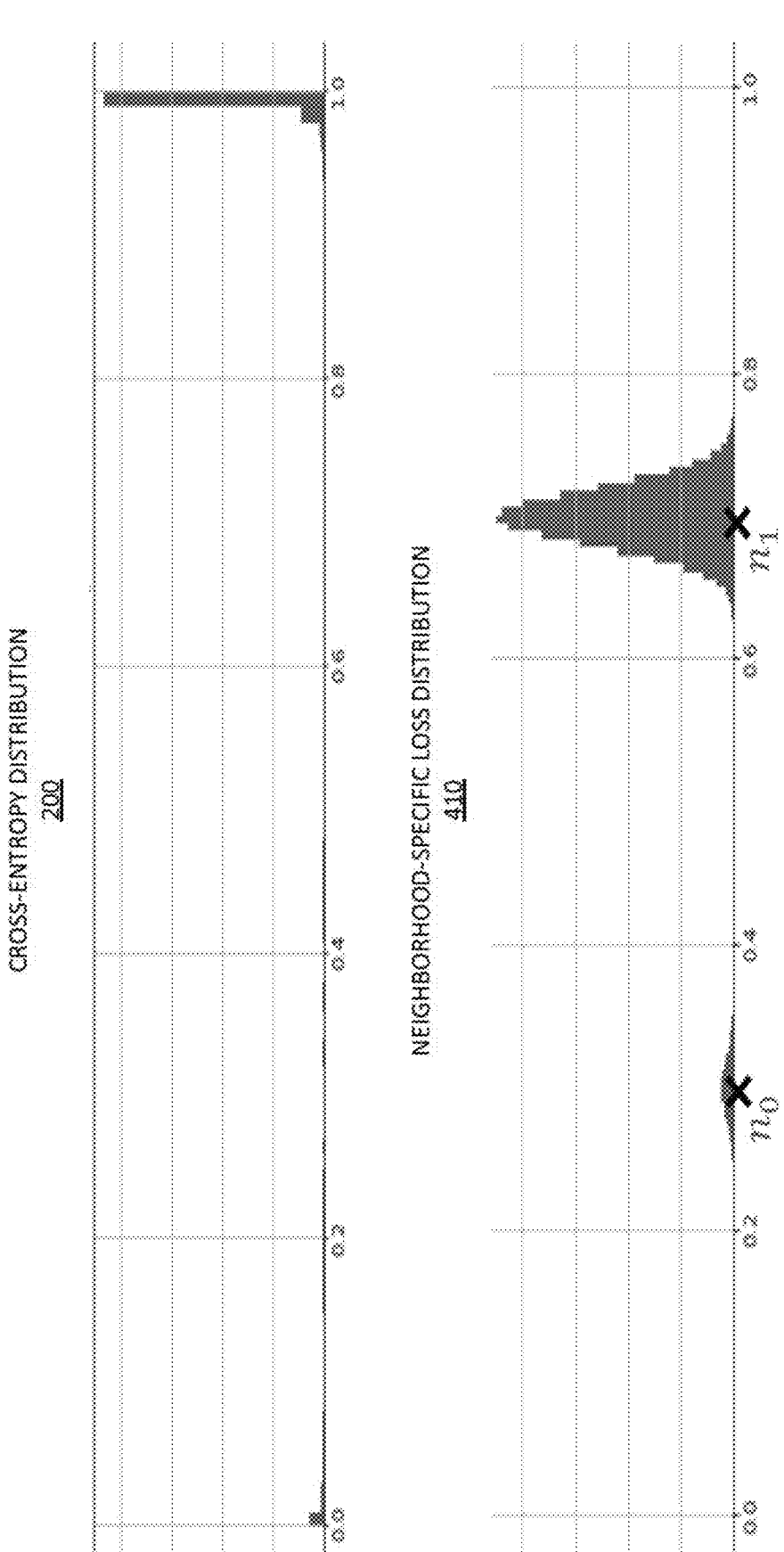
FIG. 4 shows a graph of a cross-entropy distribution and a neighborhood-specific loss distribution according to embodiments.

FIG. 4 shows a graph of a cross-entropy distribution 200 and a neighborhood-specific loss distribution 410 according to embodiments. The neighborhood-specific loss distribution 410 is an example of a result of performing a binary classification using a neural network that implements a binary classifier with a neighborhood-specific loss function as the loss function. As shown in FIG. 4, the use of a neighborhood-specific loss function modifies the centers of the bimodal distribution to be centered about the first parameter $n_0$ and the second parameter $n_1$. In the example shown by FIG. 4, the first parameter $n_0$ is equal to 0.3 and the second parameter $n_1$ is equal to 0.7. As opposed to the cross-entropy distribution 200, the neighborhood-specific loss distribution 410 localizes the prediction scores of the neural network to be proximate to either the first parameter $n_0$ or the second parameter $n_1$. The cross-entropy distribution 200 is instead highly spiked about 1, but has a wider distribution of prediction scores between 0 and 0.5. The neighborhood-specific loss distribution 410 instead localizes the output prediction scores to be, in this example, within a distance of 0.1 of either the first parameter $n_0$ or the second parameter $n_1$.

A threshold can be applied to the neighborhood-specific loss distribution 410 to classify the inputs of the neural network (e.g., training samples or second samples) as belonging to a first classification or a second classification. The threshold can indicate that inputs with a prediction score below the threshold belong to the first classification and inputs with a prediction score above the threshold belong to the second classification. As an example, the value 0.5 can be used as a threshold, and each input that has a prediction score below 0.5 can indicate that the input belongs to the first classification and each output that has a prediction score above 0.5 indicate that the input belongs to the second classification. As the first parameter $n_0$ and the second parameter $n_1$ localize prediction scores to be proximate to their values, it can be said that prediction scores proximate to the first parameter $n_0$ belong to the first classification and prediction scores proximate to the second parameter $n_1$ belong to the second classification.

III. Method

FIG. 5 shows a flowchart for a method 500 according to embodiments. The method 500 may train a machine learning model using a neighborhood-specific loss function that has a first parameter $n_0$ and a second parameter $n_1$. The neighborhood-specific loss function can result in the output score distribution of the machine learning model to be centered about the first parameter $n_0$ and the second parameter $n_1$. The method 500 can be performed by a computer, such as server computer that communicates with various external devices.

At step 502, the computer can receive a training dataset that includes training samples. Each training sample can include a binary label and a first set of input features. One example of the training dataset can be a transaction dataset, where each training sample corresponds to a transaction. The training samples of the transaction dataset can include a first set of input features formed by transaction data of the transaction (e.g., a transaction amount, merchant location, transaction type, etc.) and a binary label that labels the transaction as a fraudulent transaction or a legitimate transaction. Another example of the training dataset can be an image dataset (e.g., a set of images that include images that have dogs and images that do not have dogs), where each training sample corresponds to an image. The training samples of the image dataset can include a first set of input features formed by the pixel data of the image (e.g., RGB data) and a binary label that labels the image as having a dog or not having a dog. Yet another example of the training dataset can be a network dataset, where each training sample corresponds to a network access request (e.g., a website access request). The training samples of the network dataset can include a first set of input features formed from network data of the network access request (e.g., IP address of the requesting computer, a timestamp of the network access request, a hardware ID of the requesting computer, etc.).

At step 504, the computer can store a machine learning model that receives the first set of input features and outputs a prediction score for each training sample. The machine learning model can be a neural network that implements a binary classifier used for binary classification. One example of such a machine learning model can be a binary classifier implemented by a neural network that attempts to classify a transaction as a fraudulent transaction or a legitimate transaction. The machine learning model can, for each training sample of the training dataset, take the first set of input features and output a prediction score.

At step 506, the computer can obtain a value of a first parameter $n_0$ corresponding to a first classification and a second parameter $n_1$ corresponding to a second classification. The first parameter $n_0$ and the second parameter $n_1$ can localize the output prediction scores of the machine learning model to be centered around their respective values. A user can obtain a value for the first parameter $n_0$ and the second parameter $n_1$ according to some criterion. For example, the user can select a separation distance between the first parameter $n_0$ and the second parameter $n_1$, such that the resultant output prediction score does or does not overlap. In another example, the user can have some previous knowledge (e.g., based on a previous iteration) such as an average number of positives (e.g., for an expected 90% appearance rate of a first classification in a binary classification, the parameters may be chosen as $n_0=0.90$ and $n_1=0.10$). In one example, after performing the method 500, the user may determine a second choice of the first parameter $n_0$ and the second parameter $n_1$ based upon the output prediction score (e.g., after step S510). For example, the user could take the mean or median of the output distribution of each of the bimodal peaks to determine the second choice of the first parameter $n_0$ and the second parameter $n_1$ and the user could then choose to retrain the machine learning model using the second choice of the first parameter $n_0$ and the second parameter $n_1$.

At step 508, the computer can training the machine learning model using a neighborhood-specific loss function. During each training step, each training sample of the training dataset can be fed as input to the neural network to obtain an output prediction score. The prediction score can then be used to calculate a loss using the neighborhood-specific loss function, which can have a form such as $$NSL = \frac{1}{N}\sum\nolimits_{i=1}^{N}\left[(1-y_i)(p_i-n_0)^2 + y_i(p_i-n_1)^2\right],$$

where $y_i$ is the binary label of the training sample and $p_i$ is the prediction score of the training sample. The neighborhood-specific loss function can have, for each training sample of the training dataset, a first difference term between the prediction score of the training sample and the first parameter value (e.g., the term $(p_i-n_0)$) and a second difference term between the prediction score of the training sample and the second parameter value (e.g., the term $(p_i-n_1)$). The binary label $y_i$ can be used to determine if the first difference term or the second difference term is non-zero (e.g., only one of $(1-y_i)$ or $y_i$ can be non-zero at a time if $y_i\in[0, 1]$). If the machine learning model is a neural network, the weight of each node in the neural network may then be modified (e.g., through backpropagation) in order to minimize the neighborhood-specific loss function. For example, a gradient of the neighborhood-specific loss function can be computed, and the weights can be modified based on the gradient to move towards a minimum of the neighborhood-specific loss function. After a sufficient number of training steps, the neural network can be considered to be trained (e.g., after the loss as determined by the neighborhood-specific loss function has reached a minimum).

At step 510, the computer can receive a second dataset including a set of second samples. The set of second samples can be similar to the training samples, except the second samples do not include a binary label (e.g., the training samples are labeled data, whereas the second samples are not). The second samples can include a set of second input features, which can be similar to the first set of input features of the training samples. For example, if the training dataset was a transaction dataset, the first set of input features can include transaction data of the training samples and the second set of input features can include transaction data of the second samples.

At step 512, the computer can input the second set of input features into the trained machine learning model. The trained machine learning model can then use the second set of input features to output a prediction score for each of the second samples of the second dataset. The prediction scores of the second samples can form a bimodal distribution centered around the first parameter $n_0$ and the second parameter $n_1$, as shown by the neighborhood-specific loss distribution 410 of FIG. 4. A threshold can then be compared to the output prediction score of each second sample to classify the second sample as belonging to a first classification (e.g., a classification of fraudulent transaction) or a second classification (e.g., a classification of legitimate transactions). Second samples with a prediction score below the threshold can belong to the first classification and second samples with a prediction score above the threshold can belong to the second classification.

Embodiments provide for several advantages. Many implementations of binary classifiers make use of cross-entropy as a loss function in the training of a machine learning model. Such implementations produce distorted prediction score distributions, which can be difficult for a user to interpret and use. Embodiments instead train the machine learning model using a neighborhood-specific loss function. The neighborhood-specific loss function localizes prediction scores output by the machine learning model to be centered about a first parameter and a second parameter, producing a prediction score distribution that has two bimodal peaks centered about the two parameters. A user can then use the trained machine learning model to generate prediction scores of a second dataset comprising second samples. The use of the neighborhood-specific loss function additionally reduces the difficulty of selecting a threshold value to classify the second samples, by reducing the spread of the score distributions.

IV. Resource Security System

In some embodiments, the second dataset can be received as part of a resource security system. For example, the resource security system can manage and provide access to a goods, access to a physical location, or website access to users. The method 500 can be used to monitor and review access requests that are processed by the resource security system.

Figure 6:
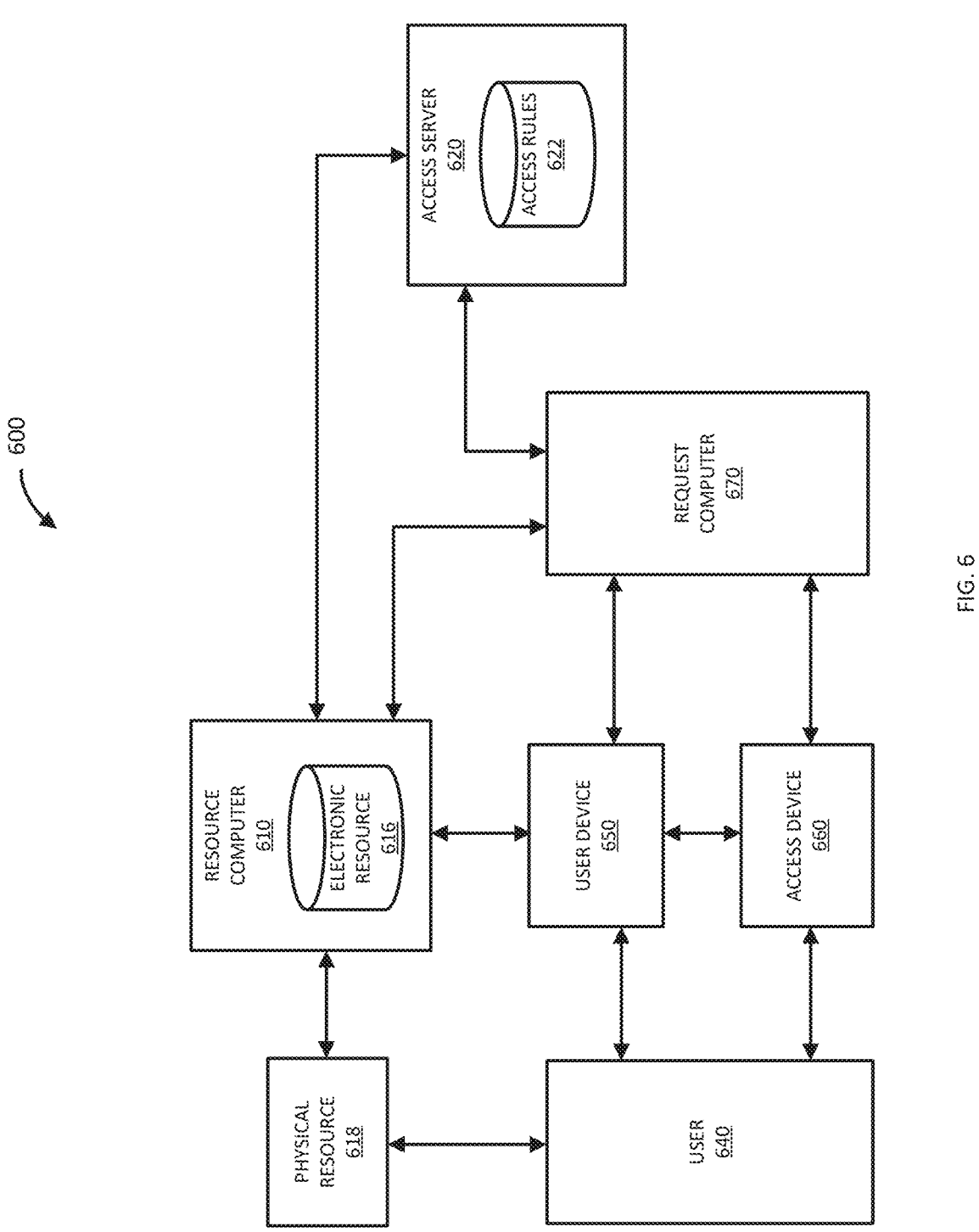
FIG. 6 shows an exemplary resource security system for authorizing access to resources according to embodiments.

FIG. 6 shows an exemplary resource security system 600 for authorizing access to resources according to embodiments. The resource security system 600 may be used to provide authorized users (e.g., via authentication) access to a resource while denying access to unauthorized users. In addition, the resource security system 600 may be used to deny fraudulent access requests that appear to be legitimate access requests of authorized users. Data of each access request processed by the resource security system 600 can be included as input features of the second dataset.

The resource security system 600 includes a resource computer 610. The resource computer 610 may control access to a physical resource 618, such as a building or a lockbox, or an electronic resource 616, such as a local computer account, digital files or documents, a network database, an email inbox, a payment account, or a website login. In some embodiments, the resource computer may be a webserver, an email server, or a server of an account issuer. The resource computer 610 may receive an access request from a user 640 via a user device 650 (e.g., a computer or a mobile phone) of the user 640. The resource computer 610 may also receive the access request from the user 640 via a request computer 670 coupled with an access device 660 (e.g., a keypad or a terminal). In some embodiments, the request computer 670 may be a service provider that is different from the resource provider.

The access device 660 and the user device 650 may include a user input interface such as a keypad, a keyboard, a finger print reader, a retina scanner, any other type of biometric reader, a magnetic stripe reader, a chip card reader, a radio frequency identification reader, or a wireless or contactless communication interface, for example. The user 640 may input authentication information into the access device 660 or the user device 650 to access the resource. Authentication information may also be provided by the access device 660 and/or the user device 650. The authentication information may include, for example, one or more data elements of a user name, an account number, a token, a password, a personal identification number, a signature, a digital certificate, an email address, a phone number, a physical address, and a network address. Some or all of the authorization information of the can be included as input features of the second dataset. In response to receiving authorization information input by the user 640, the user device 650 or the request computer 670 may send an access request to the resource computer 610 along with one or more parameters of the access request. The access request may include the authorization information provided by the user 640.

In one example, the user 640 may enter one or more of an account number, a personal identification number, and password into the access device 660, to request access to a physical resource (e.g., to open a locked security door in order to access a building or a lockbox) and the request computer 670 may generate and send an access request to the resource computer 610 to request access to the resource. In another example, the user 640 may operate the user device 650 to request that the resource computer 610 provide access to the electronic resource 616 (e.g., a website or a file) that is hosted by the resource computer 610. In another example, the user device 650 may send an access request (e.g., an email) to the resource computer 610 (e.g., an email server) in order to provide data to the electronic resource 616 (e.g., deliver the email to an inbox). In another example, the user 640 may provide an account number and/or a personal identification number to an access device 660 in order to request access to a resource (e.g., a payment account) for conducting a transaction.

In some embodiments, the resource computer 610 may verify the authorization information of the access request based on information stored at the request computer 670. In other embodiments, the request computer 670 may verify the authorization information of the access request based on information stored at the resource computer 610.

The resource computer 610 may receive the request substantially in real-time (e.g., account for delays computer processing and electronic communication). Once the access request is received, the resource computer 610 may determine parameters of the access request. In some embodiments, the parameters may be provided by the user device 650 or the request computer 670. For example, the parameters may include one or more of: a time that the access request was received, a day of the week that the access request was received, the source-location of the access request, the amount of resources requested, an identifier of the resource being request, an identifier of the user 640, the access device 660, the user device 650, the request computer 670, a location of the user 640, the access device 660, the user device 650, the request computer 670, an indication of when, where, or how the access request is received by the resource computer 610, an indication of when, where, or how the access request is sent by the user 640 or the user device 650, an indication of the requested use of the electronic resource 616 or the physical resource 618, and an indication of the type, status, amount, or form of the resource being requested. In other embodiments, the request computer 670 or the access server 620 may determine the parameters of the access request. Some or all of the parameters can be included as input features of the second dataset.

The resource computer 610 or the request computer 670 may send the parameters of the access request to the access server 620 in order to determine whether the access request is fraudulent. The access server 620 may store a machine learning model 622 for identifying a fraudulent access request. The access server 620 may determine an access request outcome indicating whether the access request should be accepted (e.g., access to the resource granted), rejected (e.g., access to the resource denied), or reviewed by comparing the output prediction score of the machine learning model 622 to a threshold value. In some embodiments, instead of determining an access request outcome, the access server 620 may use the prediction score. The prediction score may indicate the risk or likelihood of the access require being fraudulent. If the prediction score indicates that the access request is likely to be fraudulent (e.g., if it indicates the access request belongs to a problematic classification), then the access server 620 may reject the access request. In some embodiments, the access server 620 may form a second sample using the information received as part of the access request. For example, the second sample can contain some or all of the information of the parameters received from the resource computer 610 and of the authorization information input by the user 640. The access server 620 may store the formed second sample as a part of a second dataset in memory. The second dataset can include access requests received a plurality of users including the user 640.

The access server 620 may send the indication of the access request outcome to the resource computer 610 (e.g., accept, reject, review, accept and review, or reject and review). In some embodiments, the access server 620 may send the evaluation score to the resource computer 610 instead. The resource computer 610 may then grant or deny access to the resource based on the indication of the access request outcome or based on the evaluation score. The resource computer 610 may also initiate a review process for the access request.

In some embodiments, the access server 620 may be remotely accessed by an administrator for configuration. The access server 620 may store data in a secure environment and implement user privileges and user role management for accessing different types of stored data. For example, user privileges may be set to enable users to perform one or more of the following operations: view logs of received access request, view logs of access request outcomes, enable or disable the execution of the machine learning model 622, update or modify the machine learning model 622, change certain access request outcomes. Different privileges may be set for different users.

The access server 620 can periodically monitor each processed access request by accessing the stored second dataset. The second dataset can include access requests originated from a plurality of users, and each access request can be included in the second dataset as a second sample. The access server 620 can then perform the method 500 using the second dataset to determine prediction scores for each of the process access requests. The access server 620 can then classify each access request as belonging to one of two binary classifications. For example, if the access request is a website access request, the access server 620 can classify the website access request as originating from a legitimate user or originating as part of a network attack such as a DDoS attack. The access server 620 may use a threshold to perform the classification, by comparing the prediction score of second sample corresponding to an access request to the threshold. If the access request is determined to belong to a problematic classification (e.g., a classification of fraudulent transactions, network attacks, etc.), the access server 620 can generate an access response message that identifies the problematic access request. The access server 620 can identify the resource computer that sent the access request and then transmit the access response message to the resource computer to indicate that the access request may be problematic (e.g., a fraudulent transaction was made), potentially indicating that access should be denied.

The resource computer 610 may store access request information for each access requests that it receives. The access request information may include the parameters of each of the access requests. The access request information may also include an indication of the access request outcome for the access request. The resource computer 610 may also store validity information corresponding to each access request. The validity information for an access request may be initially based on its access request outcome. The validity information may be updated based on whether the access request is reported to be fraudulent. In some embodiments, the access server 620 or the request computer 670 may store the access request information and the validity information.

V. Computer System

Figure 7:
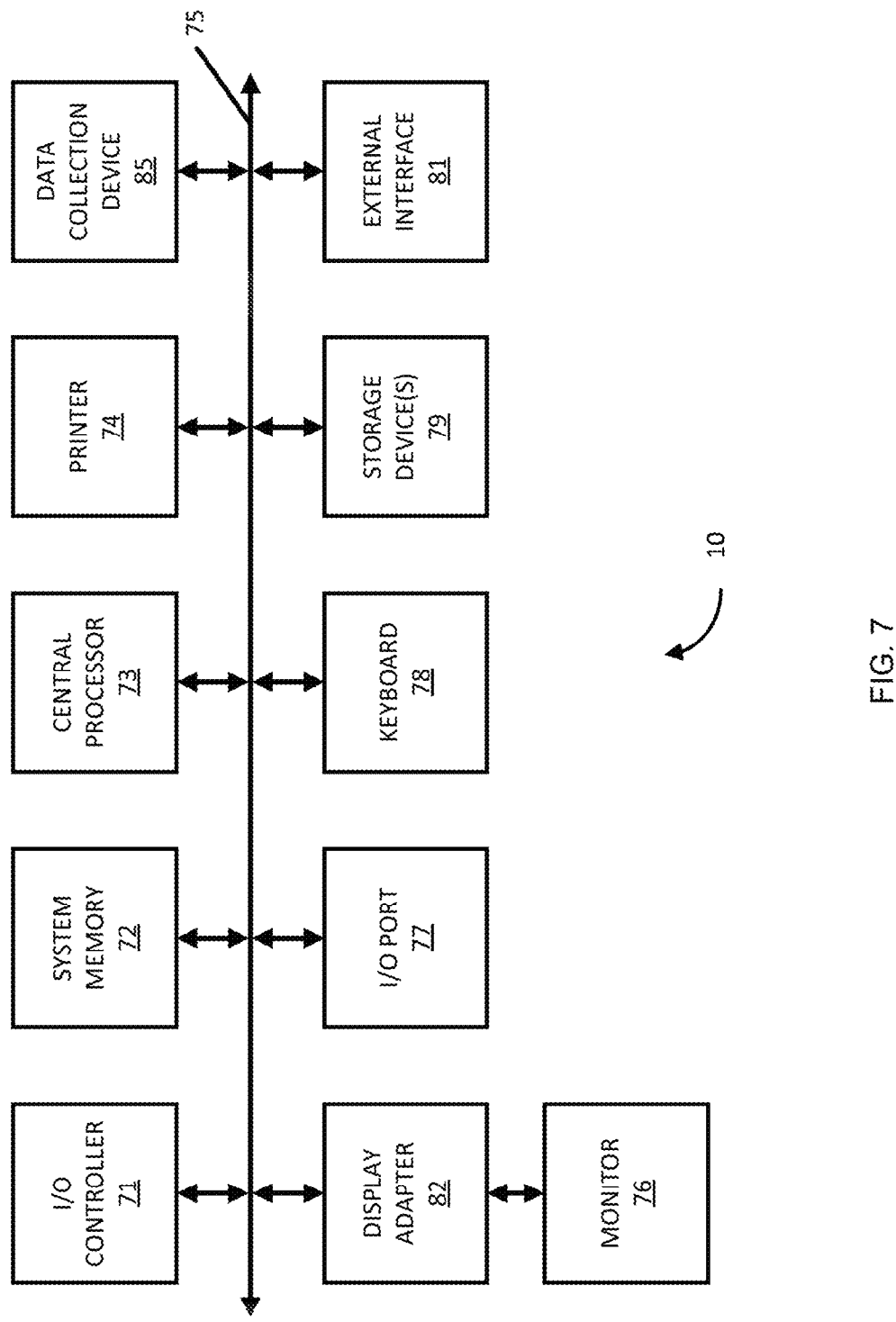
FIG. 7 shows a block diagram of an exemplary computer system according to embodiments.

FIG. 7 shows a block diagram of an exemplary computer system according to embodiments.

Any of the computer systems mentioned herein may utilize any suitable number of subsystems. Examples of such subsystems are shown in FIG. 7 in computer apparatus 10. In some examples, a computer system includes a single computer apparatus, where the subsystems can be components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 7 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire) For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some examples, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the methods described herein may be totally or partially performed with a computer system including one or more processors, which can be configured to perform the steps. Any operations performed with a processor may be performed in real-time. The term "real-time" may refer to computing operations or processes that are completed within a certain time constraint. The time constraint may be 1 minute, 1 hour, 1 day, or 7 days. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps The specific details of particular embodiments may be combined in any suitable manner without departing from the spirit and scope of embodiments of the disclosure. However, other embodiments of the disclosure may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

All patents, patent applications, publications, and descriptions mentioned herein and in the appendix are incorporated by reference in their entirety for all purposes. None is admitted to be prior art. Where a conflict exists between the instant application and a reference provided herein, the instant application shall dominate.

What is claimed is:

1. A method performed by a computer, the method comprising:

receiving a training dataset that includes a set of training samples, each training sample including a binary label and a first set of input features;

storing a machine learning model that, for each training sample, receives the first set of input features and outputs a prediction score of the training sample, wherein prediction scores below a threshold indicate a first classification and prediction scores above the threshold indicate a second classification;

obtaining a first parameter value corresponding to the first classification and a second parameter value corresponding to the second classification for training the machine learning model;

training, using the training dataset, the machine learning model using a neighborhood-specific loss function, wherein the neighborhood-specific loss function has, for each training sample of the training dataset, a first difference term between the prediction score of the training sample and the first parameter value and a second difference term between the prediction score of the training sample and the second parameter value, wherein the binary label determines whether the first difference term or the second difference term is non-zero;

receiving a second dataset that includes a set of second samples, each second sample including a second set of input features; and for each second sample of the second dataset:

inputting the second set of input features into the trained machine learning model, determining, by the trained machine learning model, using the second set of input features, a prediction score, outputting the prediction score, and wherein the prediction scores of the second samples form a bimodal distribution centered around the first parameter value and the second parameter value.

2. The method of claim 1, wherein the machine learning model is a neural network with a depth of at least three.

3. The method of claim 1, wherein obtaining the first parameter value and the second parameter value is based on a separation distance.

4. The method of claim 1, wherein the first parameter value and the second parameter value have a separation distance of 0.2 or greater.

5. The method of claim 1, wherein the first parameter value is in the range of 0.2 and 0.4, and the second parameter value is in the range of 0.6 and 0.8.

6. The method of claim 1, wherein training the machine learning model comprises modifying a set of weights of the machine learning model by computing the gradient of the neighborhood-specific loss function.

7. The method of claim 1, wherein the machine learning model implements a binary classifier and wherein, for each second sample of the second dataset, the prediction score of the second sample is compared to the threshold to classify the second sample as belonging to the first classification or the second classification.

8. The method of claim 1, wherein the training dataset and the second dataset comprise transaction data.

9. The method of claim 1, wherein the training dataset and the second dataset comprise network data.

10. The method of claim 1, wherein the first difference term is a squared difference between the prediction score of the training sample and the first parameter value and the second difference term is a squared difference between the prediction score of the training sample and the second parameter value.

11. The method of claim 1, wherein the second samples of the second dataset correspond to a plurality of access requests and the second samples include authorization information input by a user and parameters received from a request computer.

12. The method of claim 11, further comprising:

comparing the prediction score of an access request of the plurality of access requests to the threshold to classify the access request as belonging to the first classification, the first classification being one of an authorized access request or an unauthorized access request; and transmitting, to the request computer, an access response message that identifies the access request of the plurality of access requests as belonging to the first classification, the first classification being one of an authorized access request or an unauthorized access request.

13. The method of claim 1, further comprising:

determining a new first parameter value and a new second parameter value based on the output bimodal distribution; and training, using the training dataset, the machine learning model using the neighborhood-specific loss function with the new first parameter value and the new second parameter value.

14. The method of claim 1, wherein the second dataset includes network data of 10,000 network access requests without any labels.

15. A computer comprising:

a processor; and a non-transitory computer readable medium comprising instructions executable by the processor to perform a method including:

receiving a training dataset that includes a set of training samples, each training sample including a binary label and a first set of input features;

storing a machine learning model that, for each training sample, receives the first set of input features and outputs a prediction score of the training sample, wherein prediction scores below a threshold indicate a first classification and prediction scores above the threshold indicate a second classification;

obtaining a first parameter value corresponding to the first classification and a second parameter value corresponding to the second classification for training the machine learning model;

training, using the training dataset, the machine learning model using a neighborhood-specific loss function, wherein the neighborhood-specific loss function has, for each training sample of the training dataset, a first difference term between the prediction score of the training sample and the first parameter value and a second difference term between the prediction score of the training sample and the second parameter value, wherein the binary label determines whether the first difference term or the second difference term is non-zero;

receiving a second dataset that includes a set of second samples, each second sample including a second set of input features; and for each second sample of the second dataset:

inputting the second set of input features into the trained machine learning model, determining, by the trained machine learning model, using the second set of input features, a prediction score, outputting the prediction score, and wherein the prediction scores of the second samples form a bimodal distribution centered around the first parameter value and the second parameter value.

16. The computer of claim 15, wherein the machine learning model is a neural network with a depth of at least three.

17. The computer of claim 15, wherein the machine learning model implements a binary classifier and wherein, for each second sample of the second dataset, the threshold is compared to the prediction score of the second sample to classify the second sample as a belonging to the first classification or the second classification.

18. The computer of claim 15, wherein the first parameter value is in the range of 0.2 and 0.4, and the second parameter value is in the range of 0.6 and 0.8.

19. The computer of claim 15, wherein training the machine learning model comprises modifying a set of weights of the machine learning model by computing the gradient of the neighborhood-specific loss function.

20. The computer of claim 15, wherein the second samples of the second dataset correspond to a plurality of access requests and the second samples include authorization information input by a user and parameters received from a request computer.

* * * * *